US008340314B2

(12) United States Patent
Scheel et al.

(10) Patent No.: US 8,340,314 B2
(45) Date of Patent: Dec. 25, 2012

(54) AUDIO SYSTEM FOR A PASSENGER AIRCRAFT AND METHOD FOR CONTROLLING SAME

(75) Inventors: Henning Scheel, Hamburg (DE); Frank Cordes, Stade (DE)

(73) Assignee: Airbus Operations GmbH, Hamburg (DE)

( * ) Notice: Subject to any disclaimer, the term of this patent is extended or adjusted under 35 U.S.C. 154(b) by 1155 days.

(21) Appl. No.: 11/670,527

(22) Filed: Feb. 2, 2007

(65) Prior Publication Data

US 2007/0189549 A1 Aug. 16, 2007

(30) Foreign Application Priority Data

Feb. 6, 2006 (DE) ........................ 10 2006 005 584

(51) Int. Cl.
*H04B 1/00* (2006.01)

(52) U.S. Cl. .............................. 381/86; 381/17; 381/95

(58) Field of Classification Search .................. 381/362, 381/1, 2, 3, 5, 10, 13, 22, 300, 302, 307, 381/311, 86, 92, 93, 94.5, 94.7, 17, 18, 19, 381/20, 304, 26, 27, 56, 71.4, 71.2, 71.7, 381/71.8, 71.11, 71.12, 71.13, 80, 82, 83, 381/85, 332, 91, 94.1, 95, 122, 119
See application file for complete search history.

(56) References Cited

U.S. PATENT DOCUMENTS

| | | | |
|---|---|---|---|
| 6,393,343 B1 | 5/2002 | Frey et al. | |
| 6,738,482 B1 * | 5/2004 | Jaber | 381/94.7 |
| 7,171,003 B1 * | 1/2007 | Venkatesh et al. | 381/66 |
| 2003/0208764 A1 | 11/2003 | Galipeau et al. | |
| 2006/0234700 A1 * | 10/2006 | Funderburk et al. | 455/431 |

FOREIGN PATENT DOCUMENTS

| | | |
|---|---|---|
| DE | 19530138 A1 | 2/1997 |
| DE | 69914617 T2 | 11/2004 |
| DE | 102004039066 A1 | 4/2005 |
| GB | 1596195 A | 8/1981 |

OTHER PUBLICATIONS

German Examination Report dated Feb. 6, 2006.

* cited by examiner

*Primary Examiner* — Vivian Chin
*Assistant Examiner* — Leshui Zhang
(74) *Attorney, Agent, or Firm* — Perman & Green, LLP

(57) ABSTRACT

An audio system for an aircraft passenger cabin and a method for controlling such an audio system for providing passengers with information programs, in which multiple loudspeakers are each disposed at a predefined loudspeaker location in the aircraft cabin, and an audio signal having at least one audio channel is reproduced via the loudspeakers wherein the at least one audio channel is output by a central processing unit to the multiple loudspeakers in the aircraft cabin via a bus system having multiple distribution units and multiple cabin units.

10 Claims, 2 Drawing Sheets

AUDIO SYSTEM FOR A PASSENGER AIRCRAFT AND METHOD FOR CONTROLLING SAME

FIELD

The invention relates to a public address system and particularly an audio system for a passenger cabin in an aircraft and a method for controlling such an audio system.

Modern audio systems for passenger cabins in commercial aircraft, also referred to as PA (passenger address) systems, are designed to reproduce spoken announcements. These spoken announcements consist of messages by the cabin crew, previously recorded safety instructions for the passengers and alarms if an emergency situation arises. These systems are safety-critical and must remain operable for a certain time even in an emergency with minimum power input from the batteries. The announcements must be sufficiently intelligible under all circumstances to ensure that important information can be broadcast in a manner that is clearly understandable.

The passenger address systems according to the related art are of low sound quality and therefore they do not lend themselves well to reproducing in-flight entertainment programmes. On the other hand, the operability of the passenger address systems must be assured even in an emergency and when running on battery power, so the current they consume must not be too high. Therefore, there are limits to the degree to which these passenger address systems can be expanded in terms of the tasks they are required to perform.

The system architecture of modern audio systems is essentially the same as that of a digital network controlled by a central controller or a central processing unit. The central processing unit sends all data streams that are destined for the passenger to digital distribution units, which in turn forward them to the respective cabin units with the peripheral devices according to the configuration of the cabin areas. Besides the actual voice signals, the data streams include parameters for adjusting the volume, controlling the light, controlling the attendant call signal, and for flag characters.

A system with passenger units that are equipped with a multi-function module is known from U.S. Pat. No. 6,393,343, for example. Each module includes its own arithmetic/logic operation unit which can be programmed via a programming interface independently of the aircraft's central processing unit. The programming interface enables the cabin units to be controlled in the passenger area, i.e., lights in the cabin lighting system and other functions can be controlled by an audio system via the interface, independently of the aircraft's central processing unit. The multipurpose module with its own arithmetic/logic operation unit and memory is connected to the aircraft's central processing unit via a data bus, e.g., for remote programming of the multipurpose module and reporting module activities to the aircraft's central processing unit. The multipurpose module serves to reduce the demands made on the memory capacity of the aircraft's central processing unit, and also enables individual, independent programming of each passenger unit, so that the entire cabin system no longer has to be retested after just one passenger unit is programmed, for example.

However, the data streams in systems of such kind provide no parameters relating to signal conditioning of the loudspeakers or for reproduction or creation of a real or virtual sound field. The loudspeaker's amplifier also includes no functions besides those of pure power amplification. Accordingly, the shape of the resulting sound field and the directivity of the loudspeaker systems in an aircraft cabin is fixed in advance, and it is very difficult, if not impossible, to adapt it to changed spatial conditions if, for example, the cabin is rearranged or equipped with more or less sound damping properties. As a result, the sound quality in the passenger cabin is still relatively limited. Optimum sound reception is only experienced by those passengers who happen to be seated in a small area of the reproduction field known as the sweet spot.

It would be advantageous to provide an audio system for a passenger area in an aircraft, with which any (virtual or real) sound fields may be reproduced for a variable configuration of the passenger cabin, while simultaneously ensuring that the emergency functions are maintained and achieving improved sound level distribution. A method for controlling such an audio system will also be described.

SUMMARY

An audio system for an aircraft passenger cabin and a method for controlling such an audio system for providing passengers with information programmes, in which multiple loudspeakers are each disposed at a predefined loudspeaker location in the aircraft cabin, and an audio signal having at least one audio channel is reproduced via the loudspeakers wherein the at least one audio channel is output by a central processing unit to the multiple loudspeakers in the aircraft cabin via a bus system having multiple distribution units and multiple cabin units.

In order to reproduce sound fields of any kind in an aircraft cabin with variable allocation, in which the emergency functions are maintained and better acoustic pressure level distribution is achieved at the same time, the provision of entertainment programmes to the passengers is assured according to the invention by a connectable expansion system in which multiple expansion loudspeakers are arranged in predetermined loudspeaker locations in the passenger cabin, via which an expansion audio signal with at least one audio channel is reproduced, and the at least one audio channel of the expansion audio signal is output to the multiple expansion loudspeakers in the aircraft cabin via a bus system having multiple audio end devices by an audio controller.

The invention is based on the fundamental principle of constructing audio system from a base system and an expansion system that may be connected in, and is disconnected in emergency situations to minimise the battery load. Whereas only the base system with a basic functionality is used to ensure that information messages are broadcast during an emergency situation, the combination of base system—possibly with expanded functionality—and the added extension system serves to reproduce entertainment programmes under normal conditions.

In order to achieve improved sound quality, when the connectable expansion system and the base system with extended functionality are used together, the sound field is synthesised by incorporating all connected loudspeaker modules. Activated via a sound field synthesis algorithm, the modules of the expansion system generate physically correct wave fields in wide transmission ranges, and these wave fields are supported by additional, psychoacoustic algorithms. Besides their primary task of reproducing informational messages, the modules of the base system also serve to supplement or support the expansion system. The combined effects of the base system and the expansion system enable improved sound distribution, as additional, local sound output is provided by the base system, and source and directional localisation of the wave fields produced by the expansion system is improved according to the law of the first wavefront. Since the sound field synthesis of the expansion system places considerable load on computing capacity and transmission rates, a flat-hierarchy bus system is used.

The aircraft cabin audio system according to the invention for providing passengers with information programmes, in which multiple loudspeakers are arranged in predetermined loudspeaker locations in the passenger cabin and an audio signal with at least one audio channel is reproduced via the loudspeakers, wherein the at least one audio channel is output to the various loudspeakers in the aircraft passenger cabin by a central processing unit via a bus system with multiple distribution units and multiple cabin units, is characterised by a connectable expansion system for providing passengers with entertainment programmes, in which multiple expansion loudspeakers are arranged at predetermined loudspeaker locations in the aircraft cabin, and via which an expansion audio signal having at least one audio channel is reproduced, wherein the at least one audio channel of the expansion audio signal is output to the multiple expansion loudspeakers in the aircraft cabin by an audio controller, via a bus system having multiple audio end devices.

In particular, the audio system according to the invention has one or more—if technically possible and reasonable—of the following features:

the expansion system includes distributed audio end devices for activating the expansion loudspeakers, and distributed collection units for collecting the output signals from cabin microphones distributed throughout the cabin;

the expansion system includes a sound synthesis unit for generating an activation signal for each of the multiple expansion loudspeakers;

the multiple expansion loudspeakers are distributed equidistantly throughout the aircraft cabin and are able to be addressed individually by the audio controller;

the network of the expansion system is a glass fibre data network.

A second aspect of the invention describes a method for controlling such an audio system for passengers in an aircraft cabin, which is characterised by providing the passengers with entertainment programmes via a connectable expansion system in which multiple expansion loudspeakers are arranged at predetermined loudspeaker locations in the aircraft cabin, and via which an expansion audio signal having at least one audio channel is reproduced, wherein the at least one audio channel of the expansion audio signal is output to the multiple expansion loudspeakers in the aircraft cabin by an audio controller, via a bus system having multiple audio end devices.

In particular, the method according to the invention for controlling an audio system has one or more—if technically possible and reasonable—of the following features:

the at least one audio channel for the base system and the at least one audio channel for the expansion system transmit two components of a wave field for reproducing an entertainment programme;

the at least one audio channel for the expansion loudspeakers serves to at least partly reduce the acoustic pressure level for predetermined spatial modes;

at least one control parameter is output for at least one of the multiple cabin units by the central processing unit, and/or at least one control parameter is output for at least one of the multiple audio end devices by the audio controller, wherein the at least one control parameter is transmitted together with wanted signals in a data stream via the bus system, and preferably includes at least one of the following variables: an amplification factor, a loudspeaker-dependent filter parameter, a signal delay, a phase position, a dynamics compression;

collecting the current sound field as generated by the audio system via cabin microphones distributed throughout the cabin and feeding the output signal from the cabin microphones back to the audio controller, so that the sound field is adapted automatically to changeable cabin sound conditions.

The invention has—among others—the following advantages. Besides its function purely as a passenger address system, the audio system according to the invention provides improved sound quality and the transmission of entertainment programmes on multiple channels. The audio system according to the invention is able to be used for adaptive sound field control and active noise reduction as well as for reproducing entertainment programmes. The system according to the invention is scalable beyond the activation of individual, fixed cabin zones with a simple announcement function, and allows it to be adapted independently to cabin layouts with different system functions (for example, public announcement mode only on the one hand and entertainment mode only on the other), or both the base system and the expansion system. The audio system may be switched between PA mode only and entertainment system with PA mode depending on the cabin configuration, and the configuration of the audio system is able to be defined temporally, i.e., it is able to be changed after a given time. Unlike existing systems, the base system is able to be integrated in the expansion system, and may take on additional signal conditioning and signal processing functions.

In this way, the audio system is able to be adapted flexibly to the configuration of cabin zones by switching between the system functionality for a purely PA base system and the system functionality for an expansion system with PA mode. The audio system according to the invention may be used continuously for adaptive sound field control and active noise reduction while it provides PA information and entertainment programme reproduction.

Additional features and advantages of the invention will be described in the following description of embodiments with reference to the accompanying drawing, by way of example only.

DRAWINGS

DETAILED DESCRIPTION

Figure 1:
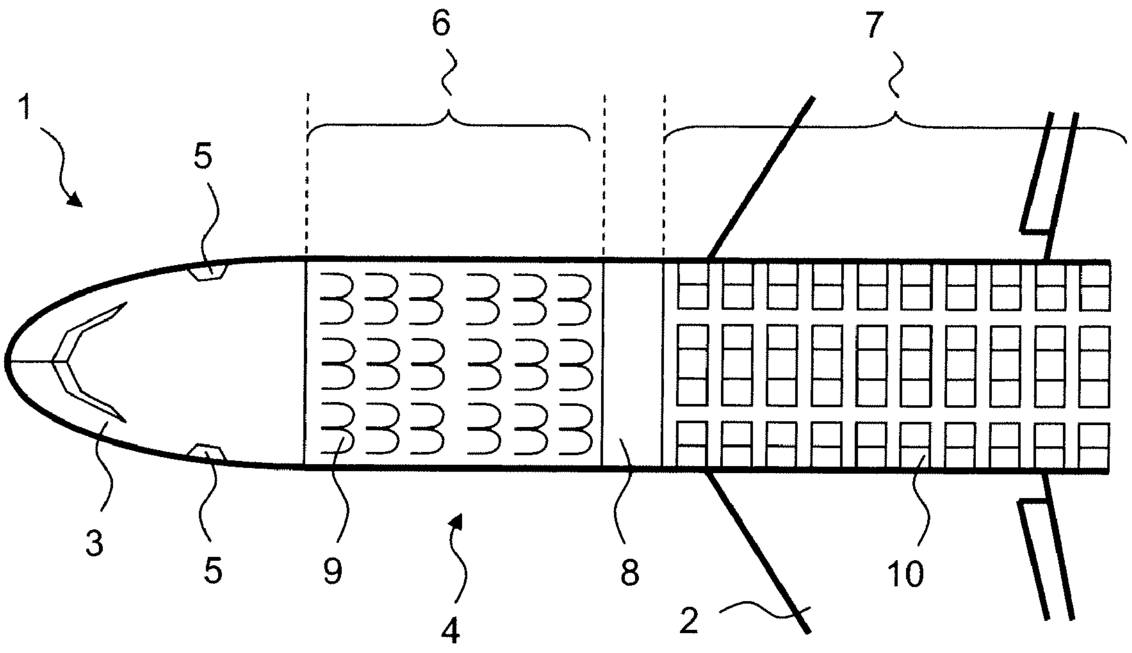
FIG. 1 is a schematic representation of a section of an aircraft with a cabin for passengers, as is known from the related art.

FIG. 1 shows the outline of a part of a passenger aircraft with fuselage 1 and wings 2. A passenger area 4 is adjacent the cockpit 3 of the aircraft. Passengers enter this passenger area 4 through outer doors 5. A first area 6 (Business Class) is located directly behind the cockpit area 3 (or behind supply areas adjacent the cockpit area which are not shown), and a second area 7 (Economy Class) is located behind this first area 6. First area 6 and second area 7 are separated by an intermediate area 8, which may include a supply section or a galley. Of course, this intermediate area 8 may also be no more than a partition wall, in which case it would be correspondingly narrow.

One of the differences between areas 6 and 7 is their respective seating plans, the seats 9 in first area 6 provide a greater level of comfort than seats 10 in second area 7. In the first, front area 6, the seats are arranged farther apart than in the second, rear area 7. The allocation of seats to the two areas 6 and 7, i.e., whether a larger or smaller number of seats at the higher comfort level is provided, is a result of financial considerations and is determined by the air route on which the aircraft is to be used. For example, in the case of the aircraft of FIG. 1, the seating allocation to the two passenger areas may also be modified so that the number of more comfortable seats in area 6 is greater than is shown in the example of FIG. 1.

Figure 2:
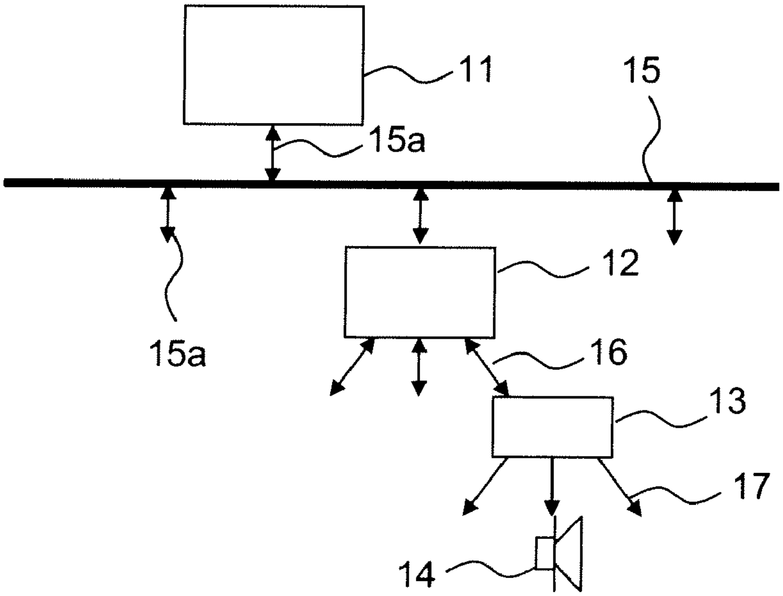
FIG. 2 shows the logic structure of a PA system of the related art.

The aircraft is equipped with an audio or public address system (not shown) to provide passengers with essential information for their flight. This known audio system for an aircraft cabin is shown in FIG. 2 and will be explained in more detail with reference thereto.

The audio system includes the central processing unit 11 and a number of distribution units 12, which are connected to the central processing unit 11 via a bidirectional bus 15, wherein each individual component that is connected to bus 15 is also equipped with corresponding bus interfaces 15*a*. Bidirectional interfaces and circuits are indicated in the figures by double-headed arrows, and unidirectional interfaces and circuits are represented by single-headed arrows. Several cabin units 13 are connected to each of several distribution units 12 via bidirectional interfaces or circuits 16, and each cabin unit also supplies several end devices 14 via unidirectional interfaces or circuits 17. In this way, a single central processing unit 11 may be used to control and monitor multiple cabin units 13 via a bus system, while the tasks that do not need to be performed centrally are assumed in decentralised manner by the distribution units 12 and/or the cabin units 13.

In this specification, the term cabin units 13 is used to refer generally to units that are distributed throughout the cabin for passengers or cabin crew, one of which being allocated to each seat or group of seats, for example.

In the embodiment shown, multiple loudspeakers 14 are supplied separately by each cabin unit 13, and are arranged in predetermined loudspeaker locations throughout the aircraft cabin. An audio signal may then be reproduced via loudspeakers 14 in passenger cabin 4. In particular, the audio signal has at least one audio channel, that is a mono reproduction channel. Preferably however, several channels are provided, e.g., one left and one right channel for stereo reproduction, or one channel for voice and another channel for background music, etc.

The base system with one central unit, distribution units, cabin units and peripheral devices in a network thus has a system architecture such as is currently known for public address systems in aircraft.

In contrast to this, in order to assure maximum flexibility of the audio system in terms of the allocation of audio channels—particularly for the purposes of different reproduction in the various sub-areas—while retaining high sound quality, the audio system according to the invention consists of two subsystems, one of which, the base system, is active continuously, and the other, the expansion system, may be coupled or uncoupled as required. The hybrid system according to the invention will be explained in the following with reference to FIG. 3.

The base system of the audio system according to the invention includes the distribution units 12 described previously, which are connected to central processing unit 11 via a bidirectional bus 15 and corresponding bus interfaces 15*a*, and to the cabin unit 13 via bidirectional circuit 16. The base system is used primarily for broadcasting information announcements and remains switched on even when other components must be switched off, for example in the event of an emergency. This applies particularly when the power supply must be switched to battery power due to a failure. Cabin units 13 are supplied via distribution units 12, by which the end devices such as loudspeakers 14, or other devices are actuated as well.

Figure 3:
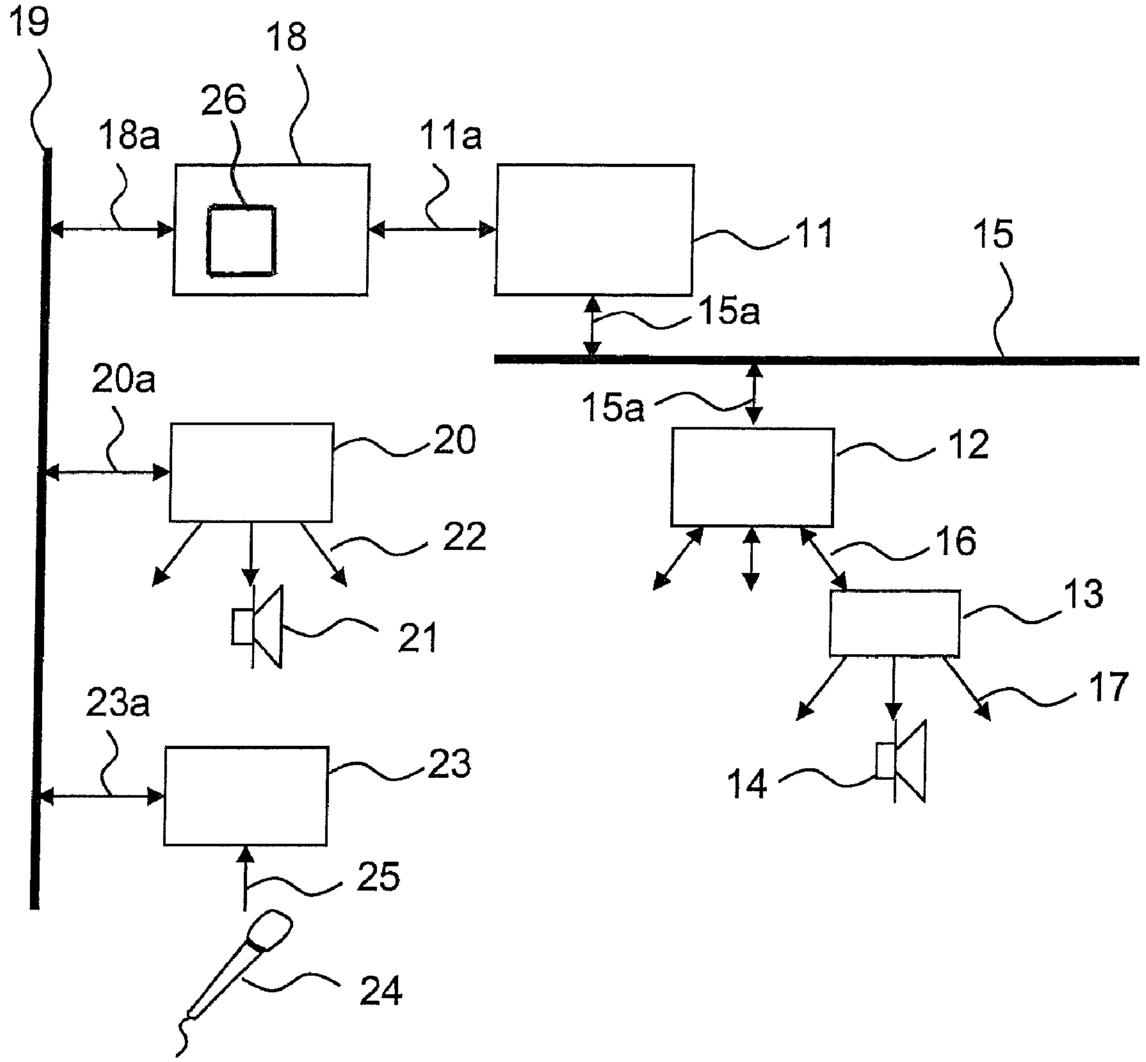
FIG. 3 shows the logic structure of an embodiment of the audio system according to the invention with base system and expansion system.

The audio system according to the invention as shown in FIG. 3 includes an audio controller 18 besides the known base system 11, 12, 13. This audio controller 18 is only activated by central processing unit 11 when the data to be reproduced is more than simple information announcements; only then is the audio controller activated. The audio controller is connected to central processing unit 11 via a bus interface ha for this purpose. Power is supplied to the end devices of the expansion system by the audio controller 18. In this way, audio controller 18 has a second bus interface 18*a* which connects it to an expansion bus 19. This expansion bus 19 in turn connects all the end devices that are able to be activated by the expansion system. Thus for example additional audio end devices 20 are provided, and are connected to expansion bus 19 via an interface 20*a*. Audio end devices 20 themselves supply expansion loudspeakers 21 via unidirectional interfaces or circuits 22, and these loudspeakers are used solely or primarily to reproduce entertainment programmes for the passengers.

In a preferred embodiment of the invention collection, units 23 are provided besides the audio end devices 20, via which sound signals may be received from the cabin. Microphones 24 are connected to collection units 23 for this purpose; the microphones pick up the sound level in the cabin and the output signal from them is collected by the respective collection unit 23 via an interface or circuit 25. Collection unit 23 includes a bus interface 23*a*, via which it sends the reception data to data bus 19 of the expansion system, from which it is retrieved by audio controller 18.

In the preferred embodiment of the invention with audio end devices 20 and collection units 23, an information feedback system is thus created between the sound field in the passenger cabin and audio controller 18. In this way, the reception signal from the cabin microphone 24 may be used to check whether the reproduction in the passenger cabin is ideal or will be unintelligible for reasons related to the respective room acoustics. The sound field may then be adapted automatically to the actual conditions, which may change over time depending on the phase of the aircraft's flight. For example, the noise level is higher during take-off and landing than during the actual flight. In other words, cabin microphones 24, which are distributed throughout the cabin, return data about the current sound field (acoustic pressure level distribution) and the status of the public address system, which in turn is encoded in a collection unit 23 and sent across the network to the audio controller. There, it is used to "repair" the signal to provide optimal sound reproduction in the cabin.

The architecture of the expansion system includes one level fewer than that of the base system (there is no unit comparable to distribution unit 12) and consists of an open network in which decentralised, distributed passenger modules or collection units 23 are incorporated for activating and controlling sound output devices (expansion loudspeakers) and input devices (cabin microphones), and for signal processing.

Bus systems and circuits 15, 15*a*, 16 and 17 of base system 11*a*, 18, and expansion system 18*a* may particularly constitute a glass fibre network, a copper cable network, or an aluminium cable network. The data packets containing the music and voice signals as well as the location-dependent parameter sets for the respective control and amplification units are sent over this network. Audio end devices 20 filter out the parameters and signals for the respective installation location on the basis of the header information and forward them to the control and amplification units. In this context, the network may have any configuration that enables data to be exchanged bidirectionally (tree, star, or ring structure).

With its distributed audio end devices 20, via which expansion loudspeakers 21 may be activated, and its collection units 23 for connecting cabin microphones 24, the expansion system as shown in FIG. 3 thus represents an open network.

When controlling the audio system described in the preceding, the base system is generally operated with components 12, 13, 14, bus system 15, and circuits 15*a*, 16, 17 in order to reproduce informational announcements. The expansion system with additional components 18, 20, 21, 23 and 24, bus system 19 and circuits 15*a*, 20*a*, 22, 23*a* and 25 is only activated when passengers are to be given access to the entertainment programme.

The expansion system particularly includes a sound synthesis unit 26 within audio controller 18, with which an activation signal is calculated for each of the multiple expansion loudspeakers 21. Expansion loudspeakers 21 are preferably located equidistantly and separately throughout aircraft cabin 4, and are addressable by audio controller 18. For reproduction by the expansion system, the sound synthesis unit 26 performs a sound field calculation, for which an algorithm for wave field synthesis known to one skilled in the art (and/or a wave field analysis for analysing the cabin sound field) may be used. In this way, it is possible to create the desired acoustic scenarios and sound fields. With an analysed wave field, and previously determined spatial modes, selective changes may also be made to the sound distribution in the cabin, in particular the acoustic pressure level may be reduced for predefined spatial modes. In detail, audio controller 18 calculates all parameter sets (amplification factors, loudspeaker-specific filter parameters, delay, phase position, dynamics compression) for the base and the expansion systems in accordance with the cabin configuration and encodes them in a data stream or a sequence of data packets together with the music and voice signals. The methods for sound field calculation, sound field control and active noise reduction are based on algorithms such as Dolby Surround (registered trademark), Ambisonic (registered trademark), Dolby ProLogic (registered trademark), wave field synthesis and analysis, and on acoustic pressure reduction of individual spatial modes that have either been predefined or are determined adaptively.

The sound field calculation or acoustic pressure reduction is performed in accordance with the properties and installation locations of loudspeakers 14 and expansion loudspeakers 21, which are stored in a memory (not shown) when the audio system is fitted in the aircraft.

Each of the parameters for sound field calculation or acoustic pressure adaptation are calculated or modified depending on the respective cabin configuration. The actual calculation of parameters may be performed by central processing unit 11 or also by audio controller 18. Alternatively, this calculation may also take place in cabin unit 13 or in audio end device 20 of the respective loudspeaker 14 or expansion loudspeaker 21. The signal coming from audio controller 18 may also be filtered, its phase may be manipulated, or the signal may be delayed in audio end device 20 before it is reproduced by expansion loudspeaker 21.

With these capabilities, the expansion system is ideal for use as a method for adaptive sound field control and active noise reduction, and may thus be operated constantly during a flight.

Conventional, dynamic loudspeakers as well as elements of the interior trim of the passenger area may be considered for use as sound emitters. Integrated, dynamic or piezoelectric vibration generators that are actuated by the control and amplification units may also be used successfully. Miniaturised units may also be attached to the back of a sound emitter and serve as amplifiers. The input stage for each is able to be set up in such a way that it automatically reads the parameters that are valid for the respective installation location from the data stream using the header information in the data packets on the data bus. They may also be equipped with a processor for digital signal processing, signal filtering and delay, and particularly for frequency response compensation of the activated sound emitter. Efficient power amplifiers (class D, PCM amplifiers) are used for preference. In this way it is possible to generate spatial sound fields in the aircraft cabin by sound field synthesis using real and virtual sound sources, without the constraints of the actual positioning of physical sound sources. This sound field is created on the basis of the actual conditions in the aircraft cabin. For this purpose, the composition of the sound fields in the aircraft cabin is captured with cabin microphones and compared in a control unit of the audio system with the output signal from the audio system, so that the output signal from the audio system is able to be adapted according to the actual conditions in the aircraft cabin. The sound field is created by a large number of loudspeakers, which are disposed in a loudspeaker matrix or array throughout the aircraft cabin, so that they are theoretically able to reflect a wave front of any shape. With time delay and amplitude scaling of the audio signals for each loudspeaker, the sound fields of the individual loudspeakers may be superimposed on each other as desired. In this way, point sources as well as an ensemble of multiple sound sources may be reproduced, and the sources may be static or mobile. Elements in the cabin that affect reproduction, such as reflection properties and the number of loudspeakers, are taken into account. At least one control parameter is output for multiple cabin units 13 by central processing unit 11 and at least one control parameter is output by audio controller 18 for multiple audio end devices 20 for this purpose. These control parameters are transmitted together with useful signals in a data stream via the bus system and filtered out by the respective end devices. The control parameters preferably include at least amplification factors, loudspeaker—specific filter parameters, signal delays, phase positions, dynamics compression.

In an embodiment of the invention that is not shown, at least some of the loudspeakers 14 and the expansion loudspeakers 21 may be identical, so that signals from both the base system and from the expansion system may be transmitted via the same loudspeaker 14/21. The advantage of this is that fewer components need to be fitted in the aircraft. On the other hand, it may be necessary to use different loudspeakers in the base system and the expansion system for purposes of sound reproduction. In this case, loudspeakers and expansion loudspeakers are both fitted in passenger area 4.

It is evident from the preceding description that the audio system is able to be installed in practically any configuration in an aircraft. In order to create a suitable sound field, the positions of the loudspeakers that would be required to create it just need to be stored in memory. If the aircraft layout of FIG. 1 is reconfigured subsequently, it is then a very simple matter to change the audio system such that for example an entertainment programme is played back in sub-area 6 of passenger area 4 at the same time as a public announcement regarding duty-free purchases or similar is made in sub-area 7 of passenger area 4.

In summary, the unique feature of the audio system according to the invention is that only the base system is used in an emergency, the expansion system being disconnected. In normal operation on the other hand, the base system may be used in support of the expansion system according to the invention, i.e., in conjunction with the expansion system for reproducing special audio signals. According to the invention, the base system may be provided in this context with extended functionality, for example to enable signal conditioning, with which—as with the expansion system—for example the spatial sound form is adjusted correspondingly by appropriate delay of the signals from selected individual loudspeaker systems or by inputting Hall sequences. In other words, the base system may be supplemented—with a possible loss of sound quality—in such manner that it is equipped similarly to the expansion system in some functions.

In this context in particular, an audio channel for the base system and an audio channel for the expansion system may transmit two components of the same wave field for reproducing an entertainment programme, so that the two systems do not transmit programmes independently of one another, but instead complement each other. The audio channel for the expansion system is then preferably used at least in part to reduce the acoustic pressure level in predefined spatial modes or sound field distributions. In other words, while an information channel is transmitted over the less powerful base system, the expansion system is used to transmit an entertainment programme via a first channel and also to reduce the acoustic pressure level via a second channel.

Cabin units 13 and audio end devices 20 for supplying loudspeakers 14 and expansion loudspeakers 21 are each equipped with amplifiers, filters and delay circuits (not shown) so that the sound field may be adapted as desired.

The audio signals in the audio reproduction system according to the invention are not limited with regard to numbers of channels. Thus one or more channels are conceivable for transmission. In addition, the audio signal may particularly include different channels for the two subareas 6 and 7 in the aircraft cabin 4.

The invention claimed is:

1. An audio system for an aircraft cabin for providing passengers with information and entertainment programmes, comprising:

a base system in which multiple base loudspeakers are arranged in the aircraft cabin, and via which an audio signal with at least one base audio channel is reproduced, wherein the at least one base audio channel is output by a central processing unit to the multiple base loudspeakers via a base bus system with multiple distribution units and multiple cabin units; and a separate expansion system, connectable to the central processing unit, the expansion system having multiple expansion speakers in the aircraft cabin, via which an expansion audio signal with at least one expansion audio channel is reproduced, wherein the expansion audio signal is output to the multiple expansion loudspeakers by the central processing unit via an audio controller and via an expansion bus system, the expansion system further comprising multiple audio end devices configured to receive a control parameter, calculated by the audio controller from sound signals from cabin microphones distributed throughout the cabin, and configured to process the audio expansion signal for performing wave field synthesis, to generate a wave field signal by using the control parameter, wherein the resulting wave field signal is output by the multiple expansion loudspeakers.

2. The audio system as recited in claim 1, wherein the expansion system includes distributed audio end devices for activating the expansion loudspeakers, and distributed collection units for collecting the output signals from cabin microphones distributed throughout the cabin.

3. The audio system as recited in claim 1, wherein the expansion system includes a sound synthesis unit for generating an activation signal for each of the multiple expansion loudspeakers.

4. The audio system as recited in claim 1, wherein the multiple expansion loudspeakers are able to be addressed individually by the audio controller and are distributed equidistantly throughout the aircraft cabin.

5. The audio system as recited in claim 1, wherein the expansion system comprises a glass fibre data network.

6. A method for controlling an audio system for an aircraft cabin for providing passengers with information and entertainment programmes, comprising a base system in which multiple base loudspeakers are arranged in the aircraft cabin, and via which an audio signal with at least one audio channel is reproduced, the method comprising:

outputting the at least one audio channel by a central processing unit to the multiple base loudspeakers via a base bus system with multiple distribution units and multiple cabin units;

reproducing an expansion audio signal having at least one audio channel by a separate expansion system connectable to the central processing unit, and having multiple expansion speakers in the aircraft cabin;

outputting the expansion audio signal via an audio controller and via an expansion bus system to the multiple expansion speakers;

calculating a control parameter from sound signals in the cabin from cabin microphones distributed throughout the cabin, using the audio controller;

processing the audio expansion signal for performing wave field synthesis to generate a wave field signal by multiple audio end devices using the control parameter; and outputting the resulting wave field signal using the multiple expansion loudspeakers.

7. The method as recited in claim 6, wherein the at least one audio channel for the base system and the at least one audio channel for the expansion system transmit two components of the wave field signal for reproducing an entertainment programme.

8. The method as recited in claim 6, wherein the at least one audio channel for the expansion system serves to at least partly reduce the acoustic pressure level for predetermined spatial modes.

9. The method as recited in claim 6, wherein at least one control parameter is output for at least one of the multiple cabin units by the central processing unit, and/or at least one control parameter is output for one of the multiple audio end devices by the audio controller, wherein the at least one control parameter is transmitted together with wanted signals in a data stream via a bus system, and preferably includes at least one of the following variables: an amplification factor, a loudspeaker-dependent filter parameter, a signal delay, a phase position, a dynamics compression.

10. The method as recited in claim 6, comprising collecting a current sound field, which is generated by the audio system, via cabin microphones distributed throughout the cabin, and collecting feedback of the output signal from cabin microphones to the audio controller, so that the sound field is adapted automatically to changeable cabin sound conditions.

* * * * *